United States Patent Office 3,179,629
Patented Apr. 20, 1965

3,179,629
CHLORINE AND PHOSPHORUS CONTAINING POLYURETHANES
Lester Friedman, Beachwood Village, Ohio, assignor to Weston Chemical Corporation, Newark, N.J., a corporation of New Jersey
No Drawing. Filed Oct. 14, 1963, Ser. No. 316,130
20 Claims. (Cl. 260—77.5)

This application is a continuation-in-part of application Serial No. 167,175, filed January 18, 1962, now Patent 3,131,206, and Serial No. 282,119, filed May 21, 1963.

This invention relates to the preparation of novel phosphonates and polyurethanes.

It is an object of the present invention to prepare novel secondary phosphonates.

Another object is to prepare novel phosphorus containing polyurethanes.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by reacting chloral with a compound having the formula

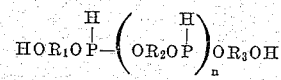

where $R_1$, $R_2$ and $R_3$ are the residues of a polyalkylene glycol from which the two hydroxyl groups have been removed and $n$ is zero or an integer.

Preferably $R_1$, $R_2$ and $R_3$ are residues of dipropylene glycol or diethyleneglycol and $n$ is preferably zero or 1.

The reaction can be carried out in the presence of an alkaline catalyst, but this is not necessary.

The compounds of the present invention have the formulae

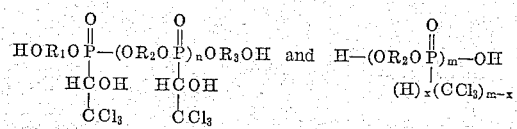

where $R_1$, $R_2$, $R_3$ and $n$ are as defined above, $m$ is an integer of 1 or more, and $x$ is an integer not greater than $m-1$.

Typical examples of compounds within the present invention are bis-dipropylene glycol α-hydroxy-β,β,β-trichloroethanephosphonate,
bis-diethylene glycol α-hydroxy-β,β,β-trichloroethanephosphonate,
bis-tripropylene glycol-α-hydroxy-β,β,β-trichloroethanephosphonate,
bis-polypropylene glycol 425 -α-hydroxy-β,β,β-trichloroethanephosphonate,
bis-polypropylene glycol 2025 -α-hydroxy-β,β,β-trichloroethanephosphonate,
bis-polyethylene glycol 3000 -α-hydroxy-β,β,β-trichloroethanephosphonate,
bis ditetramethylene glycol-α-hydroxy-β,β,β-trichloroethanephosphonate,
tris dipropylene glycol bis α-hydroxy-β,β,β-trichloroethane diphosphonate,
tris diethylene glycol bis α-hydrovy-β,β,β-trichloroethane diphosphonate,
tetra dipropylene glycol tris α-hydroxy-β,β,β-trichloroethane triphosphonate,
bis-(block copolymer of polypropylene glycol 1620 molecular weight+17.4% ethylene oxide)-α-hydroxy-β,β,β-trichloroethanephosphonate.

As starting materials there are employed secondary phosphites such as bis-dipropylene glycol phosphite,
bis-tripropylene glycol phosphite,
bis-polypropylene glycol molecular weight 425 phosphite,
bis-polypropylene glycol molecular weight 1025 phosphite,
bis-polypropylene glycol molecular weight 2025 phosphite,
bis-diethylene glycol phosphite,
bis-polyethylene glycol molecular weight 3000 phosphite,
bis-ditetramethylene glycol phosphite,
tris dipropylene glycol bis phosphite,
tris diethylene glycol bis phosphite,
tris tripropylene glycol bis phosphite,
tetra dipropylene glycol tris phosphite,
randomly mixed tris polyethylene oxide-polypropylene oxide adducts of phosphorous acid.

The term "a polyalkylene glycol" in the claims is intended to include polyalkylene glycols made from a mixture of alkylene oxides, e.g., a random mixture of ethylene oxide and propylene oxide.

The di phosphites and tri phosphites can be prepared by heating the corresponding mono phosphite and removing the diol formed by distillation or by reacting the polyalkylene glycol with the stoichiometric amount of dialkyl phosphite. Thus, tris dipropylene glycol bis phosphite can be formed by heating bis dipropylene glycol phosphite in a vacuum and removing dipropylene glycol by distillation until 0.5 mol has been removed for each mol of the starting phosphite.

As alkaline catalyst there can be used tertiary amines, e.g., trimethyl amine, triethyl amine, tributyl amine, dimethyl aniline, pyridine, N-methyl morpholine, triethylene diamine, sodium phenolate, sodium methylate, anion exchange resins, e.g., the quaternized aminomethyl styrene-divinyl benzene copolymers such as Amberlite IR-410, etc. The amount of catalyst is not critical and can be from 0.1–10% by weight of the reactants.

When using polyphosphites such as tris-dipropylene glycol bis phosphite, several different products can be obtained depending on the molar ratio of chloral to phosphite. Thus, from one mole of tris dipropylene glycol bis phosphite and one mole of chloral there is obtained tris dipropylene glycol phosphite α-hydroxy-β,β,β'-trichloroethanephosphonate while when two moles of chloral are employed per mol of tris dipropylene glycol bis phosphite the product is tris dipropylene glycol bis α-hydroxy-β,β,β-trichloroethane diphosphonate.

The phosphonates of the present invention are useful in polyester formulations. Thus, they can be reacted mol for mol with maleic anhydride, phthalic anhydride, dimethyl terephthalate, fumaric acid and adipic acid to form such polyesters.

They are also useful as reactive intermediates in forming epoxy resins. They are particularly valuable in forming polyurethanes. The urethane polymers so formed are flame resistant and are useful as linings for textiles, insulation in building construction, upholstery filling material, carpet underlays, shock absorbing fillings for packages, etc. The polyurethanes are particularly valuable since they are nonburning and are dimensionally stable.

Unless otherwise indicated, all parts and percentages are by weight.

Example 1

105 grams (0.33 mol) of bis dipropylene glycol phosphite were treated with 50 grams (0.33 mol) of chloral with efficient agitation and external cooling to keep the exothermic reaction under control. When the exotherm subsided the colorless liquid was heated on a steam bath and the volatile materials present, e.g., the triethyl amine and any unreacted chloral, were removed in a vacuum. The clear, colorless viscous liquid was essentially pure bis dipropylene glycol-$\alpha$-hydroxy-B,B,B-trichloroethane-phosphonate.

Example 2

The process of Example 1 was repeated replacing the bis dipropylene glycol phosphite by 77 grams (0.33 mol) of bis diethylene glycol phosphite to give as a clear, colorless viscous liquid residue bis diethylene glycol-$\alpha$-hydroxy-B,B,B-trichloroethane-phosphonate.

Example 3

The process of Example 1 was repeated replacing the bis dipropylene glycol phosphite by 100 grams (0.2 mol) of tris dipropylene glycol bis phosphite and replacing the chloral by 60 grams (0.4 mol) of chloral. The product was a clear, colorless very viscous liquid which was tris dipropylene glycol bis $\alpha$-hydroxy-B,B,B-trichloroethane diphosphonate.

Example 4

The process of Example 3 was repeated replacing the tris dipropylene glycol bis phosphite by 0.2 mol of tris diethylene glycol bis phosphite to produce tris diethylene glycol bis $\alpha$-hydroxy-B,B,B-trichloroethane diphosphonate.

Example 5

The procedure of Example 3 was repeated using only 0.2 mol of chloral to produce tris dipropylene glycol phosphite $\alpha$-hydroxy-B,B,B-trichloroethane phosphonate.

As previously indicated the phosphonates of the present invention can be reacted with polyisocyanates to form polyurethanes. They can be the sole hydroxyl reactant present or they can be used in admixture with other polyhydroxy compounds (polyols) in forming the polyurethanes. Foamed polyurethanes can be obtained by adding water prior to or simultaneously with the addition of the polyisocyanate.

Alternately, foams can be made by uniformly distributing a liquefied fluorine containing haloalkane in either the phosphonate or polyisocyanate reactant and then mixing the reactants and permitting the temperature of the mixture to rise during the ensuing reaction above the boiling point of the liquefied gas, e.g., dichlorodifluoromethane, trichlorofluoromethane, dichlorotetrafluoroethane, etc.

Foamed polyurethanes can be made by either the one shot or two step procedure. The polyurethanes prepared according to the invention are solids and can be used in the manner previously indicated.

The unfoamed polyurethanes can be molded into cups and other articles and used to form protective coatings on wood, steel or glass.

As examples of organic polyisocyanates which can be employed to make the polyurethanes there can be employed toluene 2,4-diisocyanate, toluene 2,6-diisocyanate, 4-methoxy-1,3-phenylene diisocyanate, diphenyl methane-4,4'-diisocyanate, 4,4'-methylene bis (phenylisocyanate), naphthalene diisocyanate, hexamethylene diisocyanate, toluene-2,4,6-triisocyanate, the reaction product of toluene diisocyanate with trimethylolpropane at an NCO/OH ratio of 2:1, PAPI which is polymethylene polyphenylisocyanate molecular weight 380 to 400, having an isocyanate equivalent of 135 (maximum), a viscosity of 400 centipoises (maximum) at 750° C., a NCO content of 31% (minimum), an acid value (p.p.m. of H$^+$) of 200 (maximum), tritolylmethane triisocyanate, 2,4,4'-triisocyanatodiphenyl ether, the reaction product of toluene diisocyanate with trimethylolpropane at an NCO/OH ratio of 2:1 (Mondur CB), the reaction product of toluene diisocyanate with 1,2,6-hexanetriol at an NCO/OH ratio of 2:1; the reaction product of toluene diisocyanate with a polyol phosphite at an NCO/OH ratio of 2:1, e.g., when the polyol phosphite is dipropylene glycol tetrol diphosphite or tris dipropylene glycol phosphite, as well as polyisocyanates listed in Siefken, Annalen, vol. 562, pages 122–135 (1949), and Saunders et al. (1962), "Polyurethanes Chemistry and Technology, Part I," pp. 156 and 348.

Alternatively, as the polyisocyanate there can be used a prepolymer made by reacting one of the above polyisocyanates with a polyhydroxy compound. Thus, there can be used prepolymers of toluene diisocyanate and castor oil, toluene diisocyanate and ethylene glycol-propylene glycol-adipate described in Kohrn Patent 2,953,839, Example 1, toluene diisocyanate and polypropylene glycol 2025; toluene diisocyanate and LG–56 (glycerine-propylene oxide adduct having a molecular weight of 3000), etc. Any of the prepolymers and polyisocyanates set forth in Friedman application Serial No. 145,749, now Patent No. 3,142,651, can be used.

The isocyanates containing 3 or more isocyanate groups are particularly valuable in forming rigid, dimensionally stable, nonburning polyurethanes with the polyol phosphonates of the present invention.

The polyol phosphonates of the present invention can be used in admixture with other polyhydroxy compounds in forming the polyurethanes. Examples of such compounds are polyethylene glycols having molecular weights of 400 to 3000, polypropylene glycols having molecular weights of 400 to 3000, ethylene glycol, propylene glycol, dipropylene glycol, diethylene glycol, 1,4-butanediol, glycerol, trimethylolpropane, glycerine-propylene oxide adducts of molecular weights 1000 and 3000, hexanetriol 1,2,6-propylene oxide adducts of molecular weights 750, 1500, 2400 and 4000, pentaerythritol-propylene oxide adduct of molecular weight 1000, castor oil, N,N,N',N'-tetrakis (2-hydroxyethyl) ethylene diamine, N,N,N',N'-tetrakis (2-hydroxypropyl) ethylene diamine (Quadrol), polyethylene adipate phthalate having free hydroxyl groups, tris dipropylene glycol phosphite, bis dipropylene glycol 2-hydroxypropoxy propane phosphonate as well as the other bis poly lower alkylene glycol hydroxy lower alkoxy lower alkane phosphonates set forth in Friedman application Serial No. 186,662, filed April 11, 1962, now Patent 3,092,651.

From 5 to 100% by weight of the hydroxyl component can be the polyol phosphonate of the present invention. A product having good non burning properties can be obtained for example by making a polyurethane from a mixture of 10% of bis dipropylene glycol $\alpha$-hydroxy-B,B,B-trichloroethane phosphonate, 15% of bis dipropylene glycol 2-hydroxypropoxypropane phosphonate and 75% of glycerine-propylene oxide adduct molecular weight 3000 with PAPI as the polyisocyanate.

In preparing the polyurethanes there can be used any of the conventional basic catalysts, e.g., N-methyl morpholine, N-ethyl morpholine, tributyl amine, 2-di-ethylamino-acetamide, Quadrol, N,N'-dimethylpiperazine, and sodium phenolate. There can also be used tin compounds such as stannous octoate, dibutyltin dilaurate, dibutyltin acetate, tributyltin laurate, dibutyltin ethoxide, octylstannoic acid, triphenyltin hydride, dibutyltin oxide, etc.

There can be used any of the basic compound and tin compounds set forth in Friedman application Serial No. 145,749, now Patent No. 3,142,651.

Conventional surfactants can be added in the amount of 1% or less. The preferred surfactants are silicones, e.g., polydimethyl siloxanes having a viscosity of 3 to 100 centistokes, triethoxydimethyl polysiloxane molecular weight 850 copolymerized with a dimethoxypolyethylene glycol of molecular weight 750 as well as any of the other siloxanes disclosed in Hostettler French Patent 1,212,252.

In the following examples there was employed the formulation:

| | Grams |
|---|---|
| Water | 0.37 |
| Dibutyltin | 0.07 |
| Polydimethyl siloxane (50 centistokes grade) | 0.12 |
| N-ethyl morpholine | 0.1 |

This mixture is designated in the following examples as Formulation A.

*Example 6*

The polyol used in Formulation A was a mixture of 1.1 grams of bis dipropylene glycol α-hydroxy-B,B,B-trichloroethanephosphonate and 7 grams of polypropylene glycol 2075. Upon addition of 5.2 grams of toluene diisocyanate there was produced a solid foam.

*Example 7*

The polyol used in Formulation A was a mixture of 1.0 gram of bis diethylene glycol α-hydroxy-B,B,B-trichloroethaneposphonate and 7 grams of LG-56 (glycerol-propylene oxide adduct molecular weight 3000). Upon addition of 5.2 grams of toluene diisocyanate there was produced a solid foam.

*Example 8*

The polyol used in Formulation A was a mixture of 1.3 grams of tris dipropylene glycol bis α-hydroxy-B,B,B-trichloroethane diphosphonate and 7 grams of polypropylene glycol 2025. Upon addition of 5.2 grams of toluene diisocyanate there was produced a solid foam.

*Example 9*

Formulation A was used omitting the water and employing 3.1 grams of bis dipropylene glycol α-hydroxy-B,B,B-trichloroethanephosphonate. There was then added 5.2 grams of toluene diisocyanate and the mixture allowed to form a prepolymer. There was then added 0.31 ml. of water and the foam obtained was cured at 110° C.

In Examples 10–13 rather than Formulation A, there was employed Formulation B. Formulation B was as follows:

| | Grams |
|---|---|
| Water | 0.37 |
| Dibutyltin dilaurate | 0.07 |
| Polydimethyl siloxane (50 centistokes grade) | 0.12 |
| N-ethyl morpholine | 0.01 |

*Example 10*

The polyol used in Formulation B was a mixture of 1.1 grams of bis dipropylene glycol α-hydroxy-B,B,B-trichloroethanephosphonate and 7 grams of polypropylene glycol 2025. Upon addition of 5.2 grams of toluene diisocyanate there was produced a solid foam.

*Example 11*

The polyol used in Formulation B was a mixture of 1.0 gram of bis diethylene glycol α-hydroxy-B,B,B-trichloroethanephosphonate and 7 grams of LG-56 (glycerol-propylene oxide adduct molecular weight 3000). Upon addition of 5.2 grams of toluene diisocyanate there was produced a solid foam.

*Example 12*

The polyol used in Formulation B was a mixture of 1.3 grams of tris dipropylene glycol bis α-hydroxy-B,B,B-trichloroethane diphosphonate and 7 grams of polypropylene glycol 2025. Upon addition of 5.2 grams of toluene diisocyanate there was produced a solid foam.

*Example 13*

Formulation B was used omitting the water and employing 3.1 grams of bis dipropylene glycol α-hydroxy-B,B,B-trichloroethanephosphate. There was then added 5.2 grams of toluene diisocyanate and the mixture allowed to form a prepolymer. There was then added 0.31 ml. of water and the foam obtained was cured at 110° C.

What is claimed is:

1. A polyurethane comprising the reaction product of an organic polyisocyanate with a member of the group consisting of phosphonates having the formulae

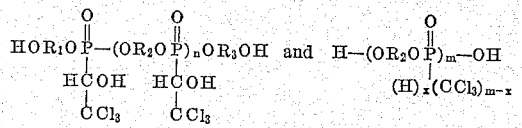

where $R_1$, $R_2$ and $R_3$ are the residues of a polyalkylene glycol from which the two hydroxyl groups have been removed, $n$ is selected from zero and an integer, $m$ is an integer, and $x$ is an integer not greater than $m-1$.

2. A polyurethane according to claim 1 wherein the polyisocyanate is an aromatic carbocyclic polyisocyanate wherein the isocyanate groups are the sole substituents.

3. A polyurethane according to claim 2 wherein the isocyanate is toluene diisocyanate.

4. A polyurethane according to claim 2 wherein the isocyanate is polymethylene polyphenylisocyanate having an average of about 3 units in the polymer chain.

5. A polyurethane comprising the reaction product of an organic polyisocyanate with a bis polypropylene glycol α-hydroxy-β,β,β-trichloroethane phosphonate.

6. A polyurethane comprising the reaction product of an organic polyisocyanate with bis dipropylene glycol α-hydroxy-β,β,β-trichloroethane phosphonate.

7. A polyurethane according to claim 6 wherein the polyisocyanate is an aromatic carbocyclic polyisocyanate wherein the isocyanate groups are the sole substituents.

8. A polyurethane according to claim 7 wherein the isocyanate is diisocyanate.

9. A polyurethane according to claim 7 wherein the isocyanate is polymethylene polyphenylisocyanate having an average of about 3 units in the polymer chain.

10. A polyurethane according to claim 6 wherein the isocyanate is the reaction product of an unsubstituted carbocyclic aromatic diisocyanate and an alkanepolyol having three hydroxyl groups.

11. A polyurethane comprising the reaction product of an organic polyisocyanate and a bis polyethylene glycol α-hydroxy-B,B,B-trichloroethanephosphonate.

12. A polyurethane comprising the reaction product of bis diethylene glycol α-hydroxy-B,B,B-trichloroethanephosponate and an organic polyisocyanate.

13. A polyurethane comprising the reaction product of an organic polyisocyanate and a tris polypropylene glycol bis-α-hydroxy-B,B,B-trichloroethane diphosphonate.

14. A polyurethane comprising the reaction product of an organic polyisocyanate and tris dipropylene glycol bis α-hydroxy-B,B,B-trichloroethane diphosphonate.

15. A polyurethane comprising the reaction product of an organic polyisocyanate and a tris polyethylene glycol bis α-hydroxy-B,B,B-trchloroethane diphosphonate.

16. A polyurethane comprising the reaction product of an organic polyisocyanate and tris diethylene glycol bis α-hydroxy-B,B,B-trichloroethane diphosphonate.

17. A polyurethane comprising the reaction product of an organic polyisocyanate and a plurality of polyols, at least one of the polyols being a bis polyalkylene glycol α-hydroxy-B,B,B-trichloroethane phosphonate, said phosphonate being at least 5% of the total of the polyols.

18. A polyurethane according to claim 17 wherein the phosphonate is bis dipropylene glycol α-hydroxy-B,B,B,-trichloroethane phosphonate.

19. A polyurethane according to claim 18 wherein one of the polyols is the adduct of a lower alkylene oxide and an alkanepolyol having at least 3 hydroxyl groups.

20. A polyurethane according to claim 17 wherein the phosphonate is bis dipropylene glycol α-hydroxy-B,B,B-trichloroethane phosphonate and the remaining polyols is a mixture of bis dipropylene glycol hydroxypropoxypropane phosphonate and the adduct of a lower alkylene oxide with an alkanepolyol having 3 to 6 hydroxyl groups.

References Cited by the Examiner
UNITED STATES PATENTS

| | | | |
|---|---|---|---|
| 3,041,295 | 6/62 | Wiech et al. | 260—2.5 |
| 3,092,651 | 6/63 | Friedman | 260—461 |
| 3,131,206 | 4/64 | Friedman | 260—461 |

LEON J. BERCOVITZ, *Primary Examiner.*

DONALD E. CZAJA, *Examiner.*